United States Patent
Haas et al.

(10) Patent No.: US 10,720,877 B2
(45) Date of Patent: Jul. 21, 2020

(54) PHOTOVOLTAIC MOUNTING SYSTEM FOR SOLAR TRACKER ARRAY

(71) Applicant: SolarCity Corporation, San Mateo, CA (US)

(72) Inventors: Robert Haas, Greenbrae, CA (US); David Molina, Oakland, CA (US); Kathryn Austin Pesce, San Francisco, CA (US); Johann Fritz Karkheck, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/212,165

(22) Filed: Jul. 15, 2016

(65) Prior Publication Data

US 2017/0250648 A1    Aug. 31, 2017

Related U.S. Application Data

(60) Provisional application No. 62/299,863, filed on Feb. 25, 2016.

(51) Int. Cl.
| | | |
|---|---|---|
| *H02S 20/32* | (2014.01) | |
| *F24S 25/65* | (2018.01) | |
| *F24S 25/632* | (2018.01) | |
| *F24S 30/425* | (2018.01) | |
| *F24S 25/634* | (2018.01) | |
| *F24S 25/12* | (2018.01) | |
| *F24S 25/63* | (2018.01) | |

(52) U.S. Cl.
CPC ............ *H02S 20/32* (2014.12); *F24S 25/632* (2018.05); *F24S 25/634* (2018.05); *F24S 25/65* (2018.05); *F24S 30/425* (2018.05); *F24S 25/12* (2018.05); *F24S 25/63* (2018.05); *Y02E 10/47* (2013.01)

(58) Field of Classification Search
CPC ......... Y02E 10/47; Y02E 10/50; H02S 20/00; H02S 20/10; H02S 20/30; H02S 20/32; H02S 30/10; H02S 20/23; H02S 20/24; H02S 20/22; F24J 2/5232; F24J 2/5254; Y02B 10/12; F24S 25/12; F24S 30/425; F24S 25/65; F24S 25/634
USPC ........................................ 248/62, 74.4, 74.1
See application file for complete search history.

(56) References Cited

U.S. PATENT DOCUMENTS

| | | | | |
|---|---|---|---|---|
| 1,898,640 | A * | 2/1933 | Moss ...................... | B60N 3/06 248/230.1 |
| 2,733,034 | A * | 1/1956 | Tormo ..................... | F16L 3/24 24/277 |
| 3,955,250 | A * | 5/1976 | Heckethorn .............. | F16B 2/08 24/277 |
| 4,143,844 | A * | 3/1979 | Van Meter ............... | F16L 25/04 248/62 |

(Continued)

FOREIGN PATENT DOCUMENTS

WO    WO-2013078533 A1 *   6/2013    ............. H02S 20/00

*Primary Examiner* — Hiwot E Tefera
*Assistant Examiner* — Taylor L Morris
(74) *Attorney, Agent, or Firm* — Dentons US LLP

(57) ABSTRACT

Mounting systems are disclosed for attaching photovoltaic modules to torque tubes. Such systems can include saddle brackets that maximize space along a torque tube by sharing torque tube mounting holes between adjacent brackets. The brackets can be positionally stable on the torque tube prior to complete installation to enable a single installer to assemble a complete tracker array.

8 Claims, 17 Drawing Sheets

(56) References Cited

U.S. PATENT DOCUMENTS

| | | | | |
|---|---|---|---|---|
| 4,265,005 A * | 5/1981 | Heckethorn | F01N 13/1805 | 24/277 |
| 4,265,422 A * | 5/1981 | Van Leeuwen | F24S 25/10 | 248/219.1 |
| 4,267,995 A * | 5/1981 | McMillan | H02G 3/32 | 174/153 G |
| 4,422,614 A * | 12/1983 | Santos | F24S 30/425 | 248/475.1 |
| 4,479,288 A * | 10/1984 | Jones | F01N 13/1805 | 24/276 |
| 4,505,006 A * | 3/1985 | Andre | F16B 2/22 | 138/106 |
| 5,833,422 A * | 11/1998 | Haga | F16B 21/20 | 411/526 |
| 6,557,908 B2 * | 5/2003 | Houtschilt | F01N 13/1805 | 285/252 |
| 6,640,517 B2 * | 11/2003 | Mitchell | E04C 3/34 | 52/298 |
| 6,948,687 B2 * | 9/2005 | Shatzky | F24S 80/30 | 248/74.4 |
| 7,017,866 B2 * | 3/2006 | Whorton | F16L 3/11 | 248/71 |
| 7,647,924 B2 * | 1/2010 | Hayden | H02S 20/30 | 126/600 |
| 7,763,835 B2 * | 7/2010 | Romeo | F24J 2/38 | 250/203.4 |
| 7,866,099 B2 * | 1/2011 | Komamine | F24J 2/5207 | 24/290 |
| 7,958,886 B2 * | 6/2011 | Barsun | F24J 2/541 | 126/600 |
| 8,052,100 B2 * | 11/2011 | Zante | H02S 20/30 | 126/600 |
| 8,240,109 B2 * | 8/2012 | Cusson | H02S 20/30 | 52/745.05 |
| 8,336,834 B2 * | 12/2012 | Matsumoto | F16L 3/1222 | 24/20 R |
| 8,475,185 B2 * | 7/2013 | Rivera | H02S 20/24 | 439/97 |
| 8,495,997 B1 * | 7/2013 | Laubach | F24J 2/5233 | 126/621 |
| 8,567,134 B1 * | 10/2013 | Grushkowitz | H02S 20/32 | 52/173.3 |
| 8,573,545 B2 * | 11/2013 | Walquist | H02S 20/30 | 248/122.1 |
| 8,578,928 B2 * | 11/2013 | Clavijo Lumbreras | H02S 20/00 | 126/600 |
| 8,757,567 B2 * | 6/2014 | Ciasulli | F24S 25/65 | 248/219.4 |
| 8,939,143 B2 * | 1/2015 | Zuritis | H02S 20/10 | 126/569 |
| 9,035,168 B2 * | 5/2015 | Barton | H02S 20/32 | 136/246 |
| 9,184,324 B2 * | 11/2015 | Wares | H02S 20/10 | |
| 9,236,514 B1 * | 1/2016 | Tarico | H01L 31/052 | |
| 9,628,019 B1 * | 4/2017 | Atcha | H02S 20/24 | |
| 2004/0140002 A1 * | 7/2004 | Brown | F24J 2/5245 | 136/251 |
| 2008/0029148 A1 * | 2/2008 | Thompson | H02S 20/00 | 136/244 |
| 2010/0089389 A1 * | 4/2010 | Seery | F16B 2/12 | 126/608 |
| 2010/0163095 A1 * | 7/2010 | Marx | H02S 20/00 | 136/244 |
| 2010/0208375 A1 * | 8/2010 | Albisu Tristan | F24S 30/42 | 359/867 |
| 2010/0320343 A1 * | 12/2010 | Beck | H02S 20/23 | 248/226.11 |
| 2011/0073104 A1 * | 3/2011 | Dopp | F24S 25/00 | 126/651 |
| 2011/0085875 A1 * | 4/2011 | Aftanas | F16B 7/187 | 411/347 |
| 2011/0138585 A1 * | 6/2011 | Kmita | H02S 20/00 | 24/522 |
| 2011/0253190 A1 * | 10/2011 | Farnham, Jr. | F24S 25/636 | 136/244 |
| 2011/0253195 A1 * | 10/2011 | Kim | F24J 2/541 | 136/246 |
| 2011/0265860 A1 * | 11/2011 | Ciasulli | F24S 25/65 | 136/251 |
| 2012/0025038 A1 * | 2/2012 | Seelman | F24J 2/5232 | 248/125.7 |
| 2012/0097816 A1 * | 4/2012 | Tamm | F24S 25/12 | 248/309.1 |
| 2012/0180845 A1 * | 7/2012 | Cole | H02S 20/20 | 136/246 |
| 2012/0205508 A1 * | 8/2012 | Cusson | F24J 2/5232 | 248/231.81 |
| 2012/0216851 A1 * | 8/2012 | Jang | H01L 31/04 | 136/246 |
| 2012/0223033 A1 * | 9/2012 | Molek | F16B 7/18 | 211/41.1 |
| 2012/0285515 A1 * | 11/2012 | Sagayama | H02S 20/24 | 136/251 |
| 2013/0008103 A1 * | 1/2013 | Sagayama | H02S 20/30 | 52/173.3 |
| 2013/0048056 A1 * | 2/2013 | Kilgore | H01R 4/26 | 136/251 |
| 2013/0102165 A1 * | 4/2013 | DuPont | H02S 40/36 | 439/95 |
| 2013/0118627 A1 * | 5/2013 | Utay | F16L 3/1016 | 138/106 |
| 2013/0125492 A1 * | 5/2013 | Molek | E04B 1/612 | 52/489.1 |
| 2013/0139870 A1 * | 6/2013 | Nuernberger | H02S 20/00 | 136/251 |
| 2013/0153519 A1 * | 6/2013 | Ashmore | F24J 2/5232 | 211/1.54 |
| 2014/0003861 A1 * | 1/2014 | Cheung | H02S 20/23 | 403/291 |
| 2014/0008312 A1 * | 1/2014 | Durney | F24J 2/5232 | 211/26 |
| 2014/0069483 A1 * | 3/2014 | Wolter | H01L 31/18 | 136/246 |
| 2014/0069877 A1 * | 3/2014 | McPheeters | F16B 2/065 | 211/26 |
| 2014/0090637 A1 * | 4/2014 | Grushkowitz | F16D 1/033 | 126/600 |
| 2014/0117190 A1 * | 5/2014 | Werner | F24J 2/14 | 248/346.03 |
| 2014/0196764 A1 * | 7/2014 | Clavelle | F24J 2/14 | 136/248 |
| 2014/0216522 A1 * | 8/2014 | Au | H02S 20/32 | 136/246 |
| 2014/0238470 A1 * | 8/2014 | Ciasulli | F24S 25/65 | 136/251 |
| 2014/0246549 A1 * | 9/2014 | West | H02S 20/30 | 248/220.22 |
| 2014/0261626 A1 * | 9/2014 | Ripoll Agullo | H02S 20/00 | 136/246 |
| 2014/0270930 A1 * | 9/2014 | Grushkowitz | F16D 1/033 | 403/337 |
| 2014/0374550 A1 * | 12/2014 | Straeter | F24J 2/523 | 248/156 |
| 2015/0000721 A1 * | 1/2015 | Au | H02S 20/32 | 136/246 |
| 2015/0007871 A1 * | 1/2015 | Durney | H02S 30/10 | 136/251 |
| 2015/0015975 A1 * | 1/2015 | Huss | G02B 7/183 | 359/853 |
| 2015/0034786 A1 * | 2/2015 | Huhn | B60N 2/015 | 248/300 |
| 2015/0075589 A1 * | 3/2015 | West | H02S 20/24 | 136/251 |
| 2015/0200621 A1 * | 7/2015 | Reed | H02S 20/32 | 248/229.17 |
| 2015/0311854 A1 * | 10/2015 | Goehringer | H02S 20/23 | 211/41.1 |

(56) References Cited

U.S. PATENT DOCUMENTS

| | | | |
|---|---|---|---|
| 2016/0218663 A1* | 7/2016 | Werner | H02S 20/10 |
| 2016/0268959 A1* | 9/2016 | Meine | F24S 25/61 |
| 2017/0102168 A1* | 4/2017 | Childress | F16C 17/10 |
| 2017/0294867 A1* | 10/2017 | Pesce | H02S 20/30 |
| 2017/0294869 A1* | 10/2017 | Pesce | H02S 20/32 |
| 2017/0294870 A1* | 10/2017 | Almy | H02S 20/32 |
| 2018/0062565 A1* | 3/2018 | Schimelpfenig | H02S 20/32 |

* cited by examiner

PHOTOVOLTAIC MOUNTING SYSTEM FOR SOLAR TRACKER ARRAY

CROSS-REFERENCES TO RELATED APPLICATIONS

This claims the benefit of U.S. Provisional Application No. 62/299,863, filed on Feb. 25, 2016, which is hereby incorporated by reference in its entirety.

BACKGROUND OF THE INVENTION

Solar trackers are used to rotate photovoltaic (PV) modules to keep them perpendicular to the direct rays of the sun. Keeping the array of PV modules at this orientation increases and ideally optimizes the amount of energy that can be generated by the array, because energy generated by a fixed tilt array drops off with the cosine of the angle of incidence of solar rays on the surface of each panel. Because tracker arrayscost more and have relatively low ground surface area utilization due to the required row-to-row spacing to prevent shading, trackers are typically used only in medium to large sized arrays (e.g., ≥1 megawatt). Although trackers add an additional cost per watt over fixed ground-mount systems, the cost is typically recouped on arrays of this size. Hardware and operating cost reductions will further expand the role of trackers in energy generation to even smaller sized arrays, that is ones below 1 megawatt.

In a single-axis tracker, photovoltaic modules are suspended above the ground in one or more horizontal rows, connected to a beam known as a torque tube. The torque tube, generally oriented along a North-South axis, is attached to a drive mechanism actuated by a controller to incrementally rotate the photovoltaic array in place over the course of the day to maintain a relatively constant angle with the sun as the sun progresses through the sky.

Some more sophisticated trackers known as dual-axis trackers not only rotate modules from East-to-West but also tilt modules towards the equator. With these trackers, modules are usually clustered together in individual sections, spaced apart from one another since they have to have greater spacing due to intra-row shading (shading of one section by an adjacent section in the same row), as well as inter-row shading (shading of one row by the adjacent row).

Because tracker arrays require very little post installation maintenance, the viability of these projects often turns on the projected rate of return derived from comparing the fixed value of the energy generated over the lifetime of the system versus the upfront costs of installation. In a multi-megawatt project, cost reductions of pennies per watt can be the difference between a project being viable or too expensive. Therefore, tracker designers are always seeking innovations to lower installation and hardware costs.

Accordingly, there remains a need for photovoltaic module assembly hardware that can make installation of solar tracker arrays more efficient and cost effective.

BRIEF SUMMARY OF THE INVENTION

Various embodiments of the invention provide new and improved methods and systems for attaching solar panels to a torque tube of a solar tracker. Various embodiments will reduce costs and increase installation speed over conventional methods and systems. Such brackets can connect quickly and efficiently to PV modules by "snap" fit type connections, e.g., fastener and tool-free. However, some brackets can utilize fasteners for connection to a PV module. Advantageously, many these brackets enable a single installer to assemble a solar tracker array efficiently and quickly by utilizing features that stabilize a PV module onto a torque tube prior to final installation. PV modules are not often overly heavy, but instead very cumbersome to handle due to large surface areas. Thus, array assembly typically requires at least two installers with one being responsible for holding the PV module in place while the other attaches the PV module to the torque tube. However, brackets disclosed herein allow a single installer to temporarily place a relatively large and cumbersome PV module in a non-final, but stable, position on the torque tube, such that the installer can "let go" of the PV module to access other portions of the assembly to complete installation.

The brackets and/or clamps as disclosed herein can also be used for mounting PV modules in other types of PV installations, for example in fixed arrays. Such fixed arrays can include fixed tilt ground-based or roof-top mounting systems, where such systems can have individual or common tubular members to which the brackets and/or clamps can be used to attach PV modules. These and other embodiments are shown and discussed in greater detail in the drawing figures and corresponding detailed description.

DETAILED DESCRIPTION OF THE INVENTION

Figure 1A:
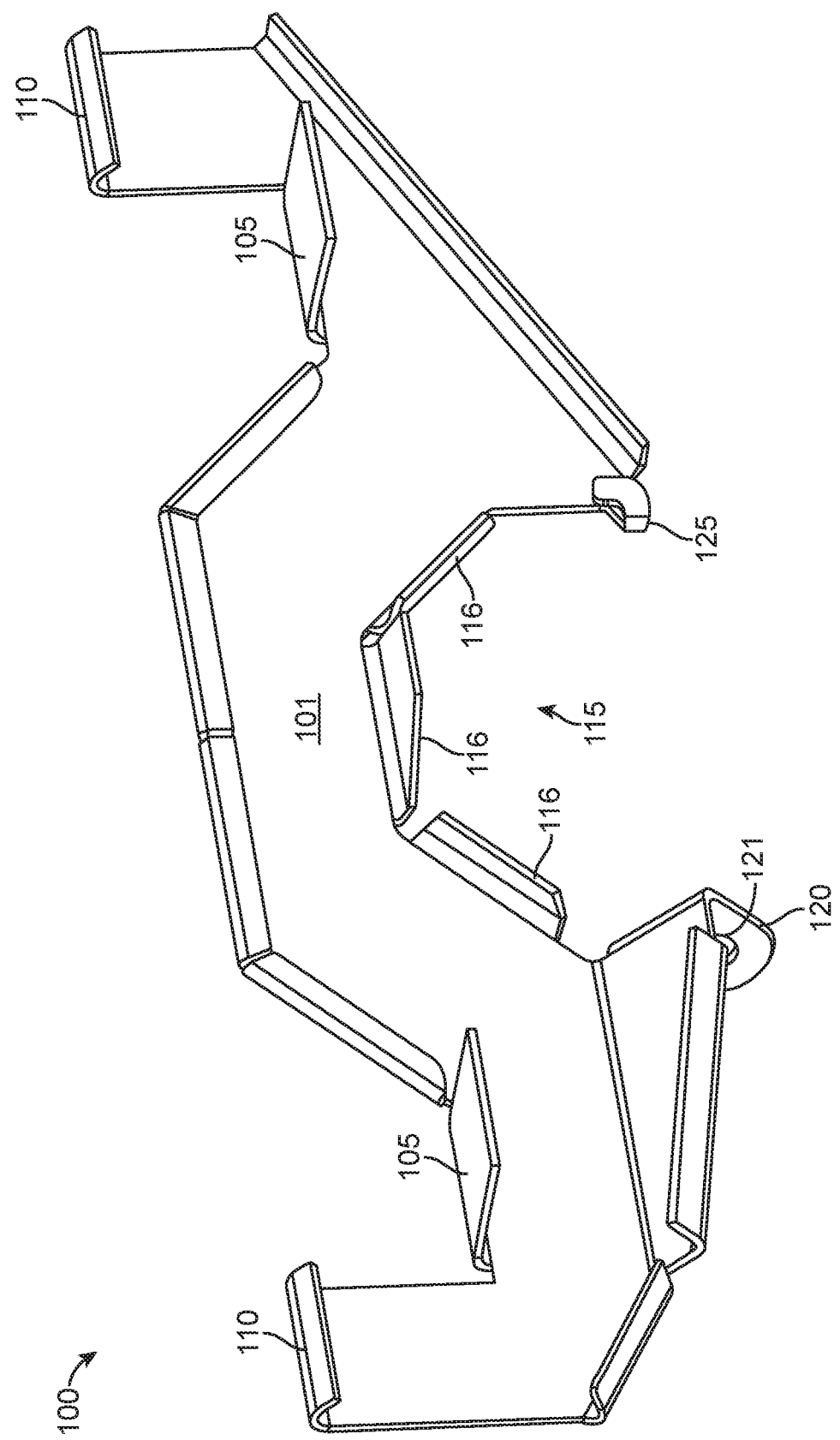
FIGS. 1A and 1B show mounting brackets for a solar tracker according to various embodiments of the invention.

Referring now to the drawing figures, FIG. 1A illustrates a mounting system for a solar tracker according to various embodiments of the invention. The system can include bracket 100 that can include wall member 101, which can extend along a plane. Various features can extend from wall member 101, including for example, a plurality of ledge portions 105, plurality of attachment tabs 110, and collar portion 115. Such features can be formed from by cutting and bending shapes from wall member 101.

Figure 1B:
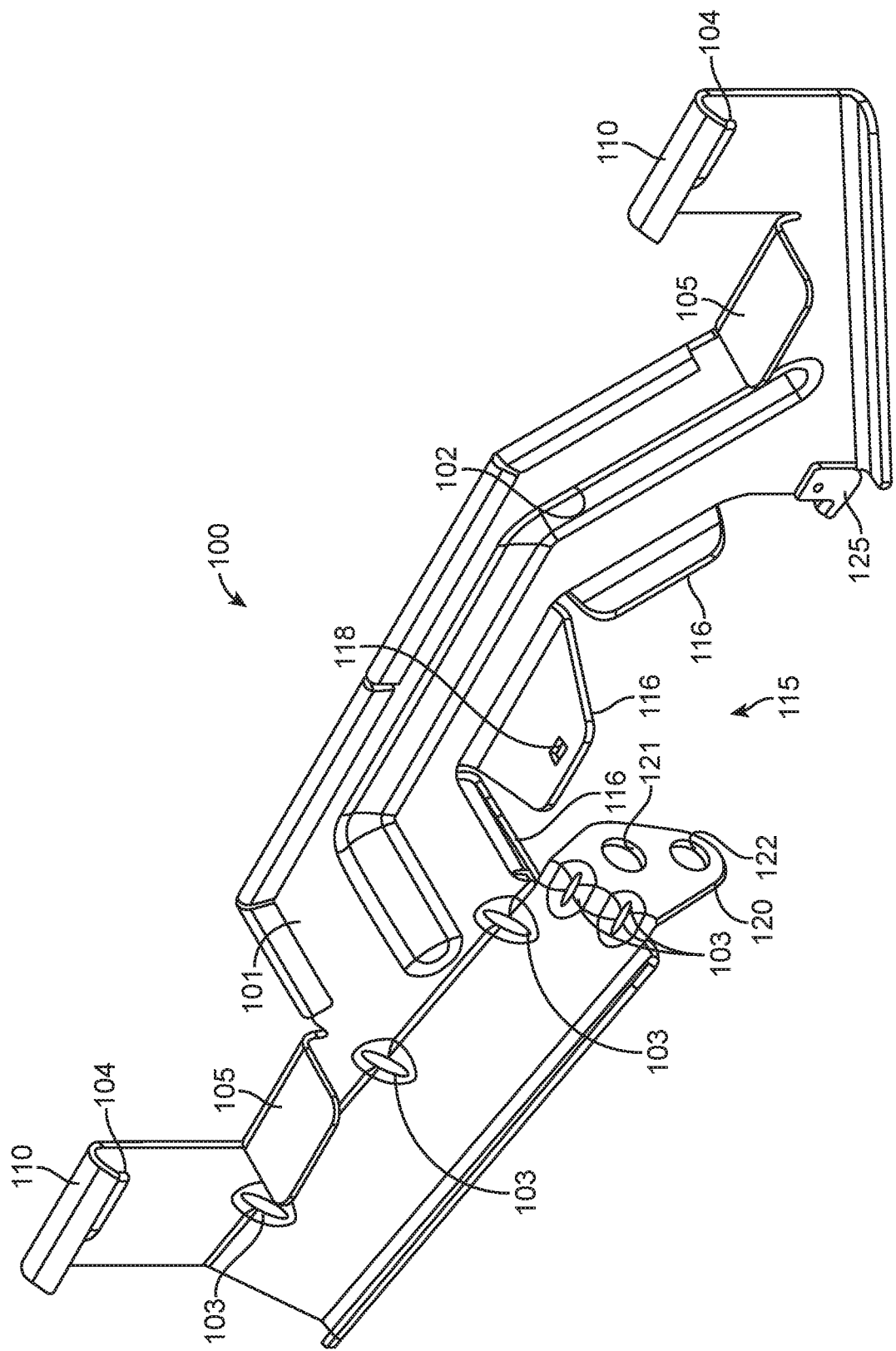

FIG. 1B shows an alternative arrangement of bracket 100, which shares many of the same features of the bracket shown at FIG. 1A, where wall member can include reinforcement portions 102. Reinforcement portions 102 can extend as ribs along wall member 101 and protrude outwardly or inwardly from a PV module that bracket 100 mounts to. Bumper portions 104 protrude outwardly from a PV module that bracket 100 mounts to. In this manner, bumper portions 104 can act as a spacer and bumper to a directly adjacent PV module and bracket having a similar reinforcement rib facing the opposite direction. This arrangement can help prevent excessive movement between PV modules and brackets, and thus help prevent the PV modules from backing out of the brackets due to wind-induced bracket sway. In addition, gussets 103 can be located at various locations along bracket 100, primarily where bends are located to help strengthen bracket 100.

With reference to both FIGS. 1A and 1B, ledge portions 105 can extend from one side of wall member 101. Ledge portions 105 can support a bottom surface of a PV module. As shown, ledge portions 105 can extend in a extend in a generally transverse (e.g., 90 degrees) manner from wall member 101, however, ledge portions 105 can also extend from wall member 101 at non-transverse angles (e.g., 70-85 degrees) as well, in order to provide spring bias (i.e., clamping force) against a PV module. Ledge portions 105 are shown extending as tab shaped elements having planer profiles. Here, ledge portions 105 are depicted to be rectangular, however, other shapes are possible as well, such as circular or triangular.

Attachment tabs 110 can also extend from wall member 101 to help support upper portions of a PV module. Attachment tabs 110 are shown as hook-like protrusions that extend laterally from wall member 101 down towards ledge portions 105. Attachment tabs 110 can extend at angles that intersect planes that extend along ledge portions 105. Attachment tabs 110 and ledge portions 105 cooperate to constrain a PV module, and hence make up portions of a so-called "saddle" for securing one side of a PV module to a torque tube. In some cases, attachment tabs 110 can form an electrical connection with a PV module to serve as a grounding path.

Collar portion 115 is generally shaped to fit around a torque tube, and is formed about a shape that is complimentary to a torque tube, which here is hexagonal for fitment onto round or hexagonal torque tubes. Other variations are possible too, such as rectangular or rounded shapes. Collar portion 115 is shown as a plurality of petal-like collar members 116 that extend laterally from wall member 101. Three of such collar members 116 are depicted in FIG. 1A-1B, but more or less of collar members 116 can be used. In addition, one or more of collar members 116 can include mounting holes 118 that can serve as attachment locations for additional fasteners or fastening mechanisms such as hooks or clasps.

Collar portion 115 may include rivet tab 120 with rivet hole 121 for attaching saddle bracket 100 to one side of a torque tube, and alignment tab 125 for attaching bracket 100 to an opposite side of the torque tube. Alignment tab 125 can include a protrusion for fitting into an opening of a torque tube. Alignment tab 125 can be formed from a portion of wall member 101, by folding for example. Alternatively, alignment tab 125 can be formed from additional material, for example a sheet metal portion that is spot welded, riveted, or bonded to wall member as depicted at FIG. 1B.

Rivet hole 121 and alignment tab 125 can be located on or proximate to the same plane that wall member 101 extends long. This arrangement can help maximize space along a torque tube by allowing sharing of fastener holes between adjacent brackets of directly adjacent first and second PV modules. That is, a first bracket of a first PV module can share the mounting holes on a torque tube with a second bracket of a second PV module. This can be performed by each alignment tab being located within a shared hole within the torque tube while the rivet tabs 120 overlap to such that rivet holes 121 are concentrically located over a shared rivet hole of torque tube. While it is not necessary that rivet hole 121 and alignment tab 125 can be located on the same plane of bracket 100 to achieve these goals, such an arrangement helps maximize space and evenly distribute stress along the array, while providing a uniform arrangement of brackets. It should be appreciated that a rivet is not the only possible means of attachment—a screw, bolt, or other suitable fastener could be used with rivet tabs 120 to attach bracket 100 to the torque tube.

In various embodiments, a torque tube may be fabricated to include mounting holes and alignment holes along its length so that brackets 100 may be used to attach several photovoltaic modules to the torque tube at the same orientation. As shown at the variation of bracket 100 as shown at FIG. 1B, rivet tab 120 can also include pull hole 122, that can serve as a grabbing location for a tool to leverage rivet hole 121 into location over a matching hole of a torque tube while alignment tab 125 is located within the torque tube. Alternatively, a hook or other shape could be used for this purpose.

In various embodiments bracket 100 will be made in left-handed and right-handed versions with the significant difference being the orientation of rivet tab 120 and alignment tab 125 is opposite. Alternatively, holes may be formed in the torque tube to allow the same bracket to be used on the left side and right side. In various embodiments, bracket 100 may be formed out of a single piece of sheet metal that is stamped and bent into the appropriate shape. However, it may also be fabricated from roll-formed metal, casting, or some other process.

Figure 1D:
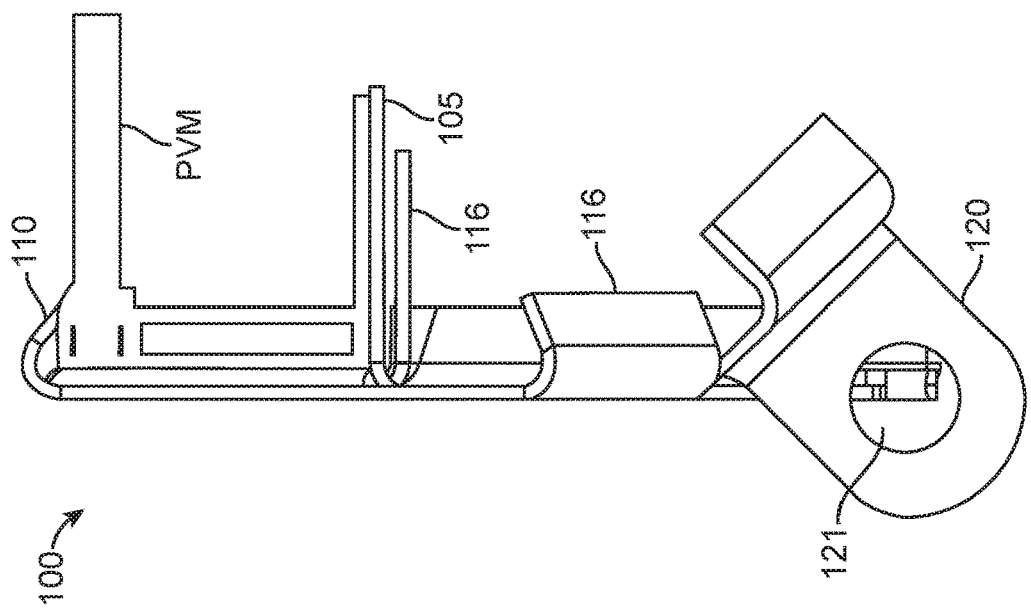
FIGS. 1C through 1G show processes for mounting brackets for a solar tracker according to various embodiments of the invention.
Figure 1C:
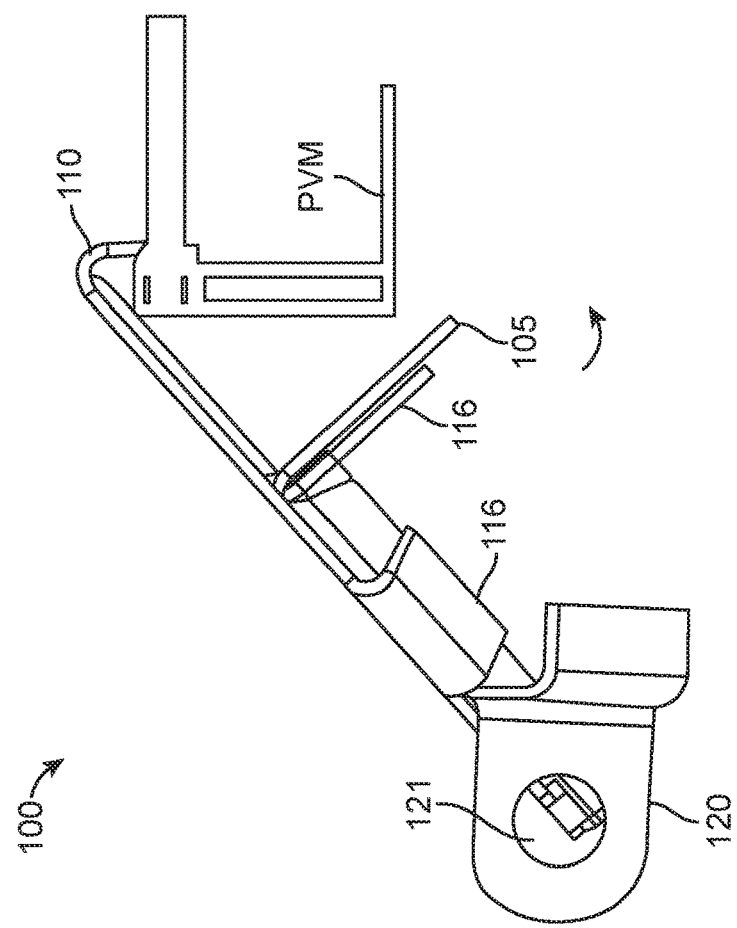

FIGS. 1C and 1D depict a sequence for installing photovoltaic modules PVM on a torque tube using bracket 100. Left and right-handed brackets 100 can be installed on each side of photovoltaic module PVM prior to placing photovoltaic module PVM on the torque tube. At FIG. 1C, attachment tabs 110 are secured onto a top portion of photovoltaic module PVM by, for example, hooking ends of attachment tabs 110 onto grooves or ledges of photovoltaic module PVM. In the view shown, bracket 100 can then be rocked or pivoted counter-clockwise or "snapped" to the position shown at FIG. 1D such that ledge portions 105 secure to a bottom portion of photovoltaic module PVM. After snapping into place, the resilient nature of attachment tabs 110 and ledge portions 105 can forcibly hold photovoltaic module PVM in place by applying compressive force to photovoltaic module PVM.

Figure 1E:
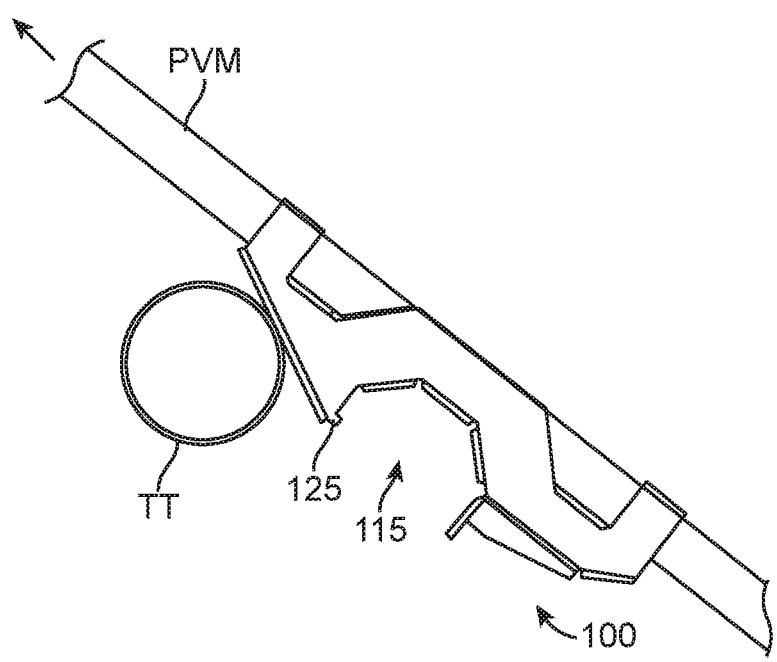
Figure 1F:
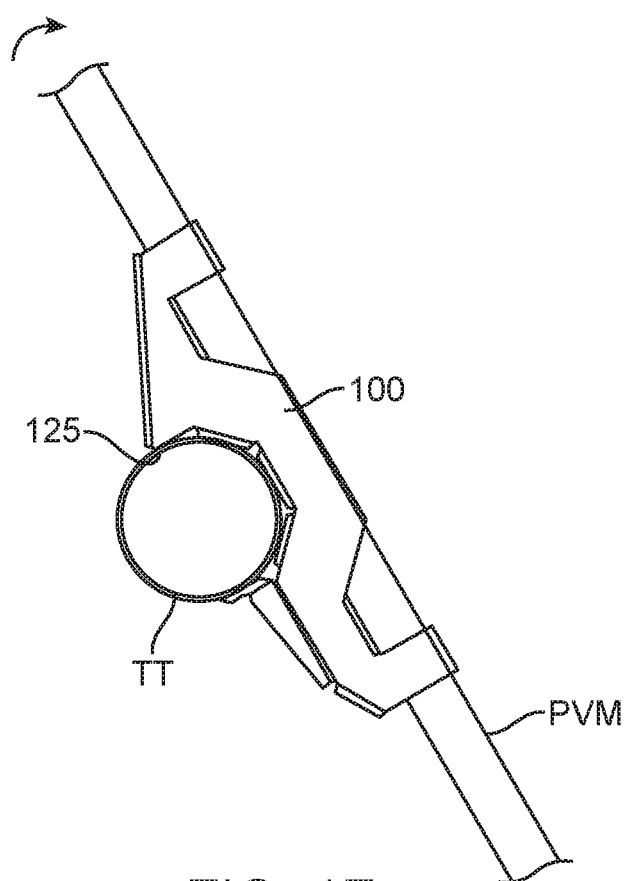

FIGS. 1E and 1F depict a sequence for positioning photovoltaic module PVM and attached brackets 100 onto torque tube TT. At FIG. 1E, an installer can place one side of photovoltaic module PVM onto torque tube TT and then push photovoltaic module PVM according to the directional arrow to place collar portion 115 onto torque tube TT. As shown, a flat angled portion of bracket 100 may serve as a ramp to guide collar portion 115 onto torque tube TT. At FIG. 1F, after collar portion 115 is over torque tube TT, photovoltaic module PVM can be rotated until alignment tab 125 falls into an opening of torque tube TT. While secured by alignment tab 125, photovoltaic module PVM can be temporarily left hanging in the position shown to allow the installer to install an adjacent photovoltaic module PVM or rivet bracket 100 to torque tube TT.

Figure 1G:
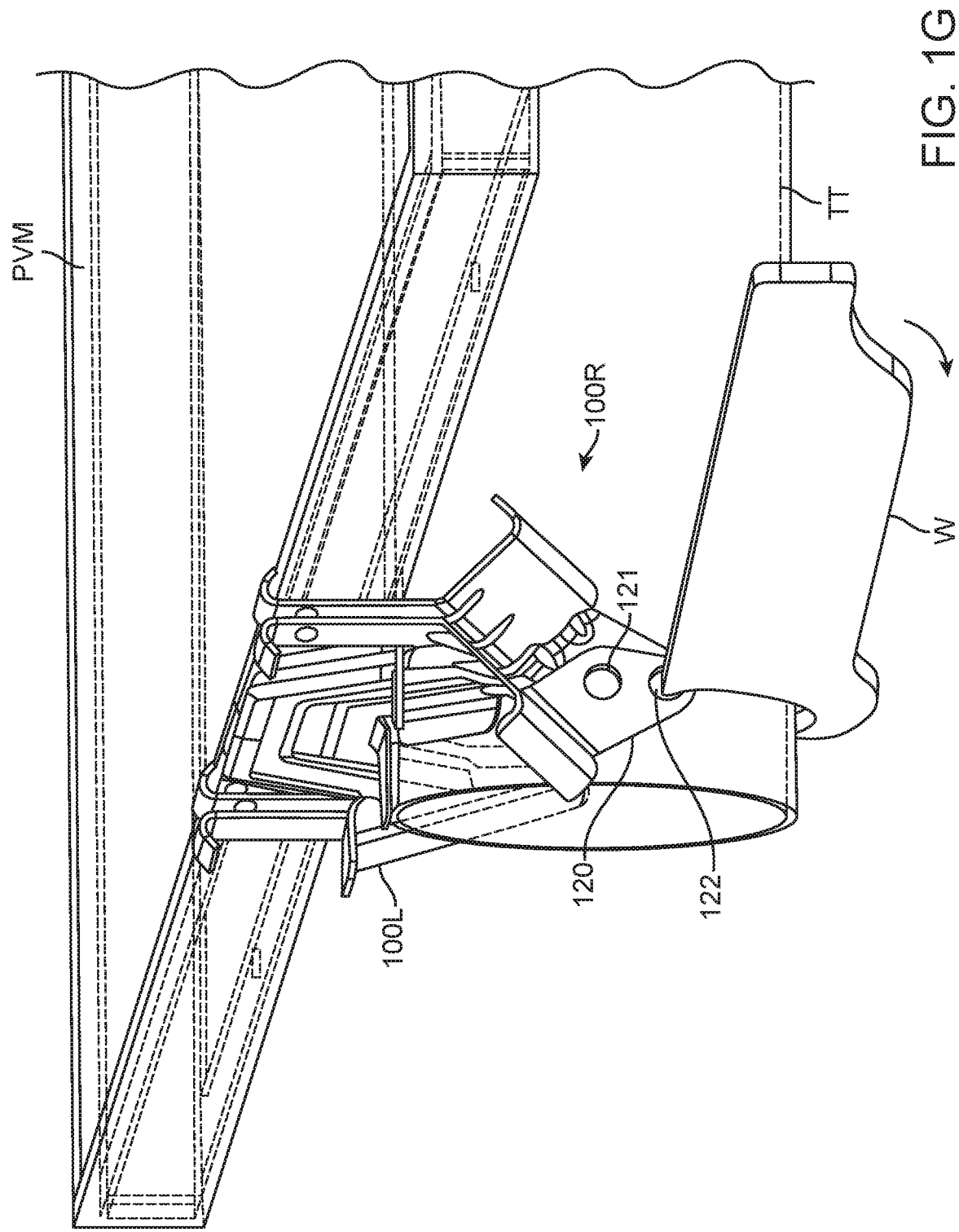

In some cases, collar portions 116 can be arranged to resiliently deform when securing bracket 100 to torque tube TT. As such, collar portions 116 can be angled to resist bending and thus provide some spring bias. Such an arrangement can help secure bracket 100 and prevent movement after installation, but also can challenge natural alignment of rivet hole 121 with a corresponding hole within torque tube TT. In cases of brackets 100 having secondary pull holes 122, such as shown at FIG. 1B, pull holes 122 can be used as points to secure wrench W when attaching left and right brackets 100L/R to torque tube TT, as depicted at FIG. 1G. Wrench W can be leveraged about torque tube TT to pull rivet holes 121 of overlapping rivet tabs 120 into position for riveting to torque tube TT.

The installer can use the torque tube as a pivot to rest the weight of the module on, held in place by collar portion 115 while the assembly (collars and photovoltaic module PVM) are rotated about torque tube TT until orientation tabs 125 on either side of the module rests in its corresponding opening in the torque tube. Bracket 100 may also include an additional rivet hole 126, as shown at FIG. 1A, that allows one bracket 100 to be riveted to an adjacent bracket, further strengthening the attachment of the modules to the torque tube. Using bracket 100, post-installation disconnection of a particular module requires simply cutting or grinding the rivet or removing the other mechanical fastener connecting bracket 100 to the torque tube, and if applicable, to the adjacent saddle bracket.

Figure 1H:
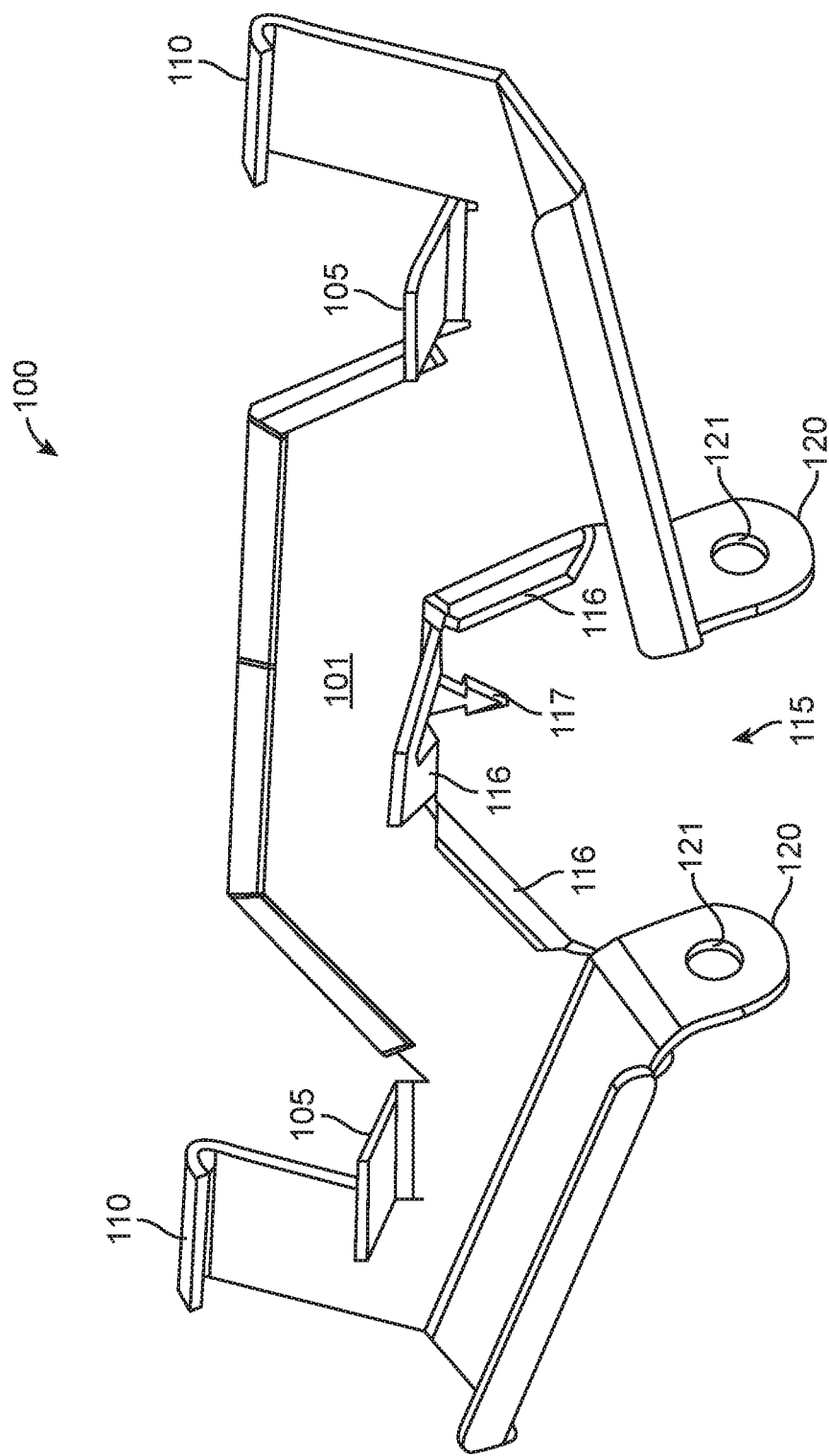
FIGS. 1H and 1I show mounting brackets for a solar tracker according to various embodiments of the invention.

FIG. 1H shows an alternative construction of bracket 100 that shares many of the same numbered aspects of the brackets depicted at FIGS. 1A and 1B. However, here, no alignment tab is present, but rather two rivet tabs 120 are provided for double riveting of bracket 100 to a torque tube. In addition, collar portion 115 includes location tab 117 that can insert into a supplementary opening of a torque tube. Location tab 117 serves to help maintain bracket 100 in position while rivets can be secured to rivet tabs 120.

Figure 1I:
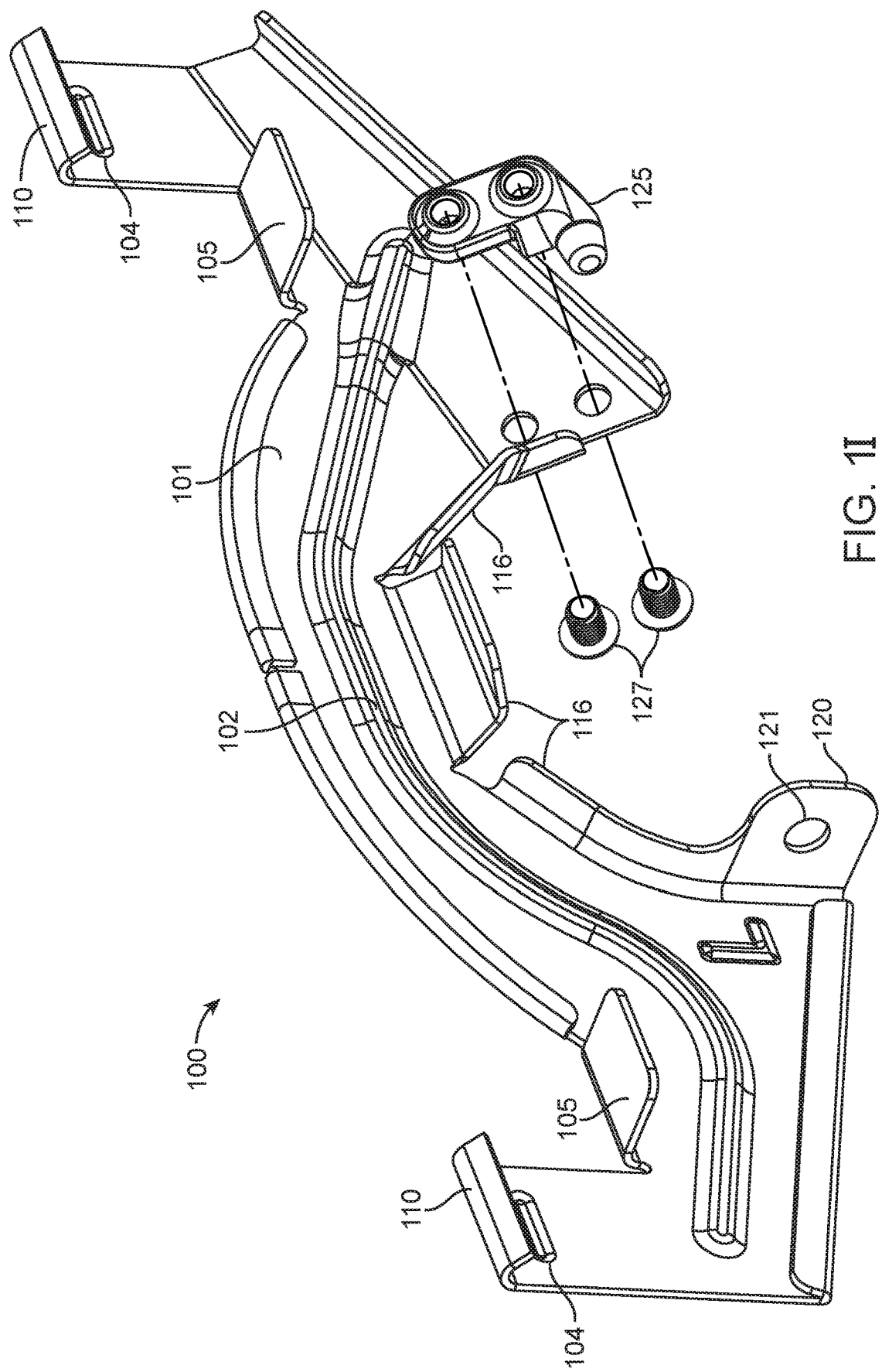

FIG. 1I shows another alternative construction of bracket 100 that shares many of the same numbered aspects of the brackets depicted at FIGS. 1A and 1B. However, here rivet tab 120 and alignment tab 125 are not coplanar with a plane that wall member 101 extends along. Accordingly, sharing of mounting holes on a common torque tube between adjacent brackets 100 is not intended or needed. Such a bracket 100 can be used at ends of a tracker array, or when an individual set of mounting holes per bracket 100 is desired. In addition, here alignment tab 125 is configured to have a separate body that bolts to a portion of wall member 101 by way of fasteners 127, which can be bolts or rivets for example. Alignment tab 125 can be constructed from a stamped or cast metal body for example, and be configured to use one or more fasteners for attachment to wall member 101.

Figure 2:
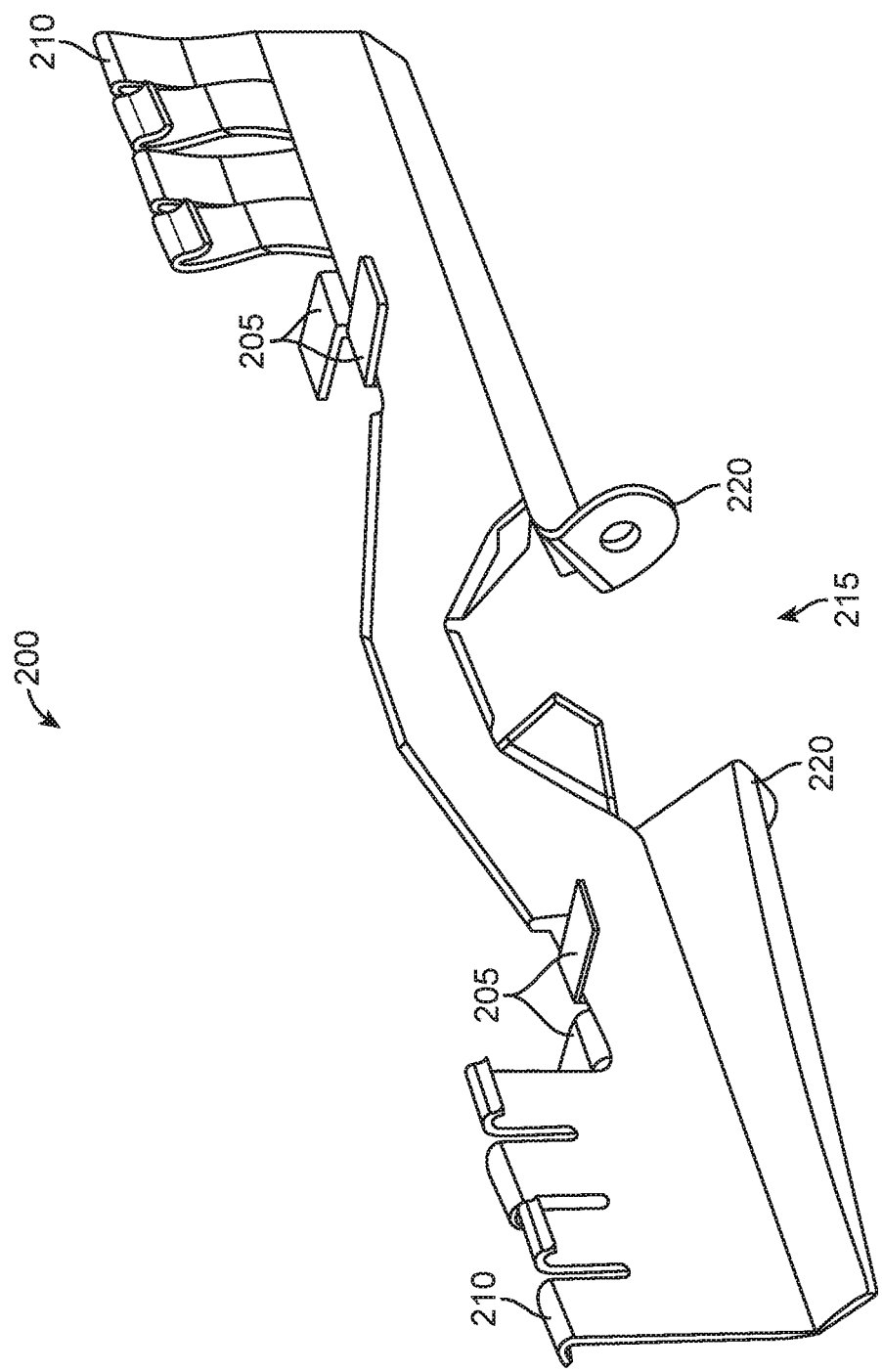
FIG. 2 shows a mounting bracket for a solar tracker according to various other embodiments of the invention.

Referring now to FIG. 2, this figure shows another photovoltaic mounting system for attaching solar panels to a torque tube. Saddle bracket 200 is similar to saddle bracket 100 with a few notable differences. First, saddle bracket 200 is not handed—in other words, the same bracket may be used for either side of a PV module. Also, as shown, bracket 200 is two-sided, so a single bracket will connect to PV modules on both sides of bracket 200. This can reduce the number of brackets from 2× the number of PV modules to 1× the number of modules +1.

Similar to bracket 100, bracket 200 can have a collar portion 215 that fits around the torque tube that may include pair of rivet tabs 220 that match up with holes fabricated in the torque tube. It should be appreciated that a rivet is not the only possible means of attachment—a screw, bolt, or other suitable fastener could be used with rivet tabs 220 to attach saddle bracket 200 to the torque tube.

Bracket 200 can have at least two pairs of opposing ledge portions 205 that support the frame of a PV module from below. Bracket 200 can also have a plurality of attachment tabs 210 that serve to bias the frame of a PV module against the opposing ledge portions 205 on either side of bracket 200.

During installation, at least one bracket 200 can be installed directly to the torque tube first, before any PV modules are placed. Then, a PV module with an identical bracket pre-attached to other side can be pivoted in at an angle and pressed down to bend back attachment tabs 205 until the module frame rests on one set of ledge portions 205 and the alignment tab returns back to the rest position with the downturned edge of the tab pressing against the top of the module frame. Then the next module can be placed in the same manner, and so on and so forth until all modules have been attached to the torque tube. The modules can have a timing mark or other feature to inform the installer as to the desired position of the module with respect to saddle bracket 200 so that all modules are attached to the brackets at the same place along the module frame, such as, for example, at or near the middle of the module frame. Given its substantially uniform construction, the middle should roughly correspond the center of mass.

Using saddle bracket 200, disconnection of a particular module may be accomplished using a special tool to push the attachment tabs holding that module down on either side out of the way to release the module from tabs 210.

Figure 3A:
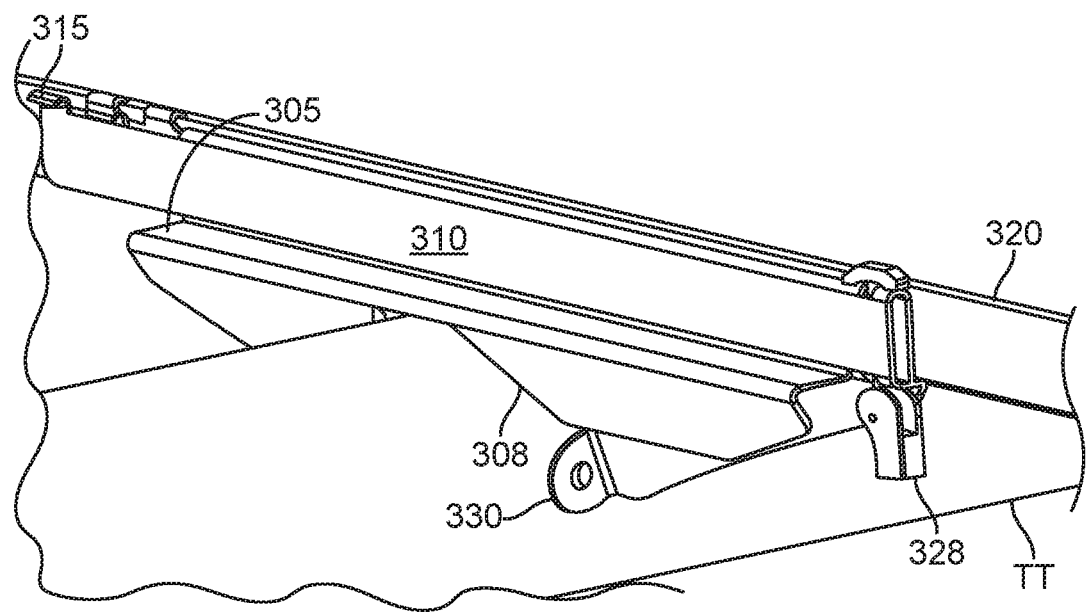
FIGS. 3A and 3B show a mounting bracket for a solar tracker according to still further embodiments of the invention.
Figure 3B:
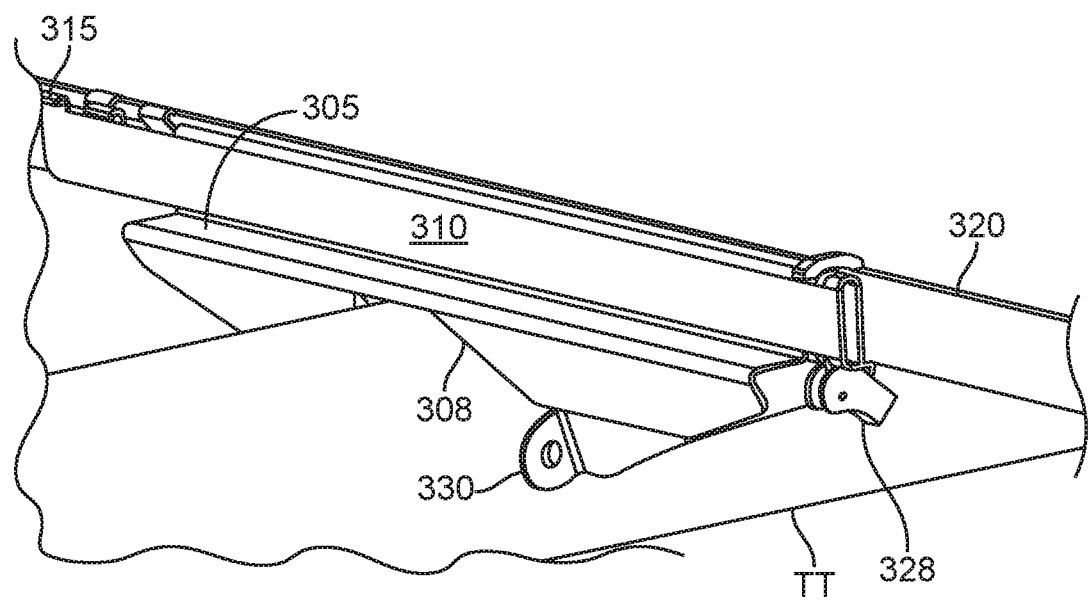

Referring now to FIGS. 3A and 3B, these figures shows yet another photovoltaic mounting system for attaching PV modules to a torque tube according to various embodiments of the invention. Bracket 300 can include collar portion 308 with rivet tabs 330 that are used to attach bracket 300 to a torque tube. Like bracket 200, bracket 300 can be first attached to the torque tube using rivets or other suitable mechanical fasteners before any PV modules are attached.

Bracket 300 can also have a pair of opposing module ledges 305 on either side of vertical spine portion 310. This enables modules to be installed on either side of bracket 300 requiring 1× the number of modules +1 such brackets per torque tube. At one end of spine portion 310, bracket 300 can have several attachment tabs 315 that bias the frames of adjacent PV modules down against ledge 305.

The other end of vertical spine portion 315 can include rotating cam lock 320 that is used to manually lock down a pair of PV modules after they are placed on either side of bracket 300. In various embodiments lever portion 325 is rotated down to free cam lock 320 to the relaxed position as depicted at FIG. 3A. After two modules are set, lever portion 325 is rotated to effect a corresponding rotation of cam lock 320 so that it covers a portion of the frame of each module instead of covering spine portion 310. Then, lever portion 325 is pressed upwards thereby pulling down on cam lock 320 to bias the module frames against shelf portion 305, as depicted at FIG. 3B. Although in the figure, lever portion 325 is designed for manual adjustment, it is possible that in other embodiments, a tool may be used to facilitate the locking and unlocking process.

Figure 4:
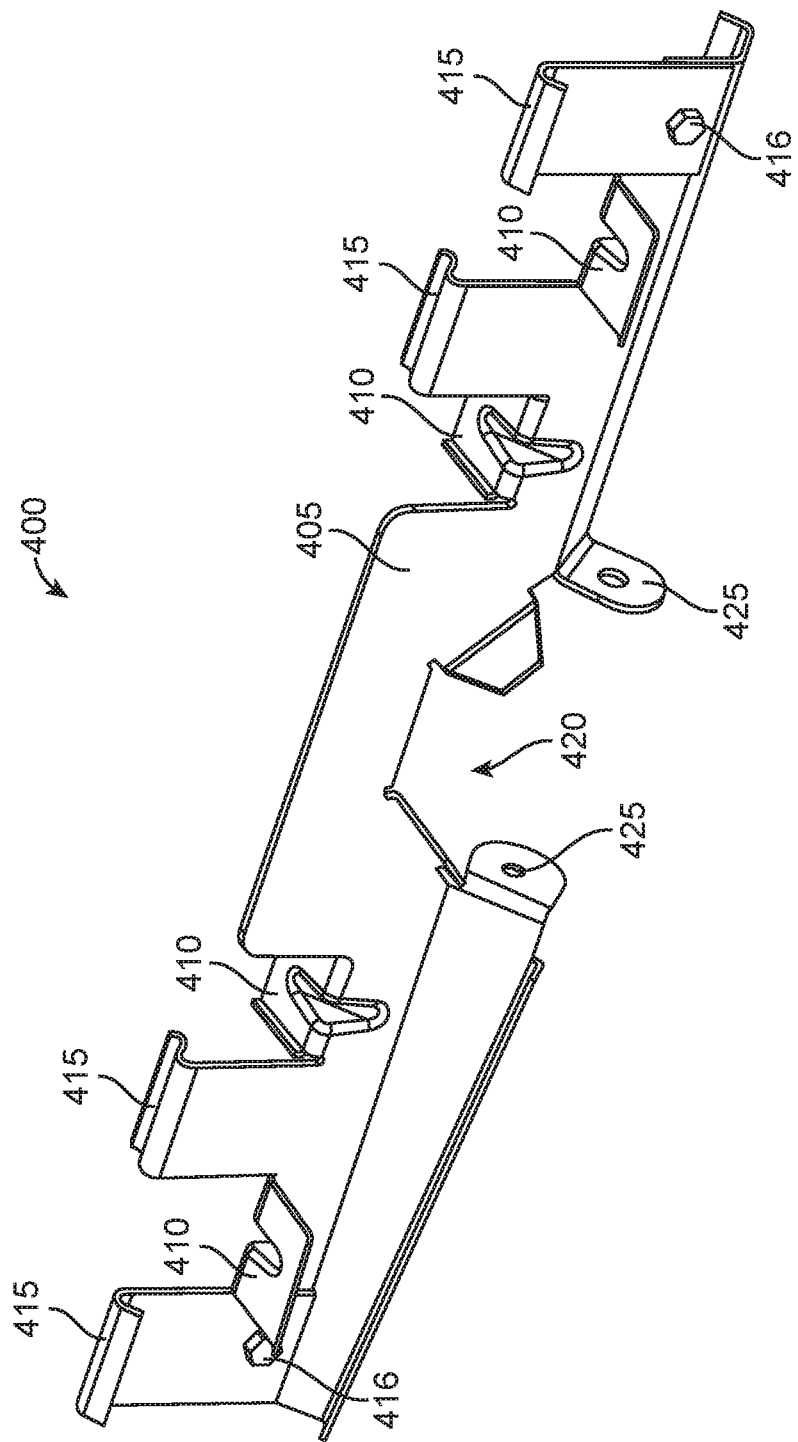
FIG. 4 shows a mounting bracket for a solar tracker according to additional embodiments of the invention.
Figure 5:
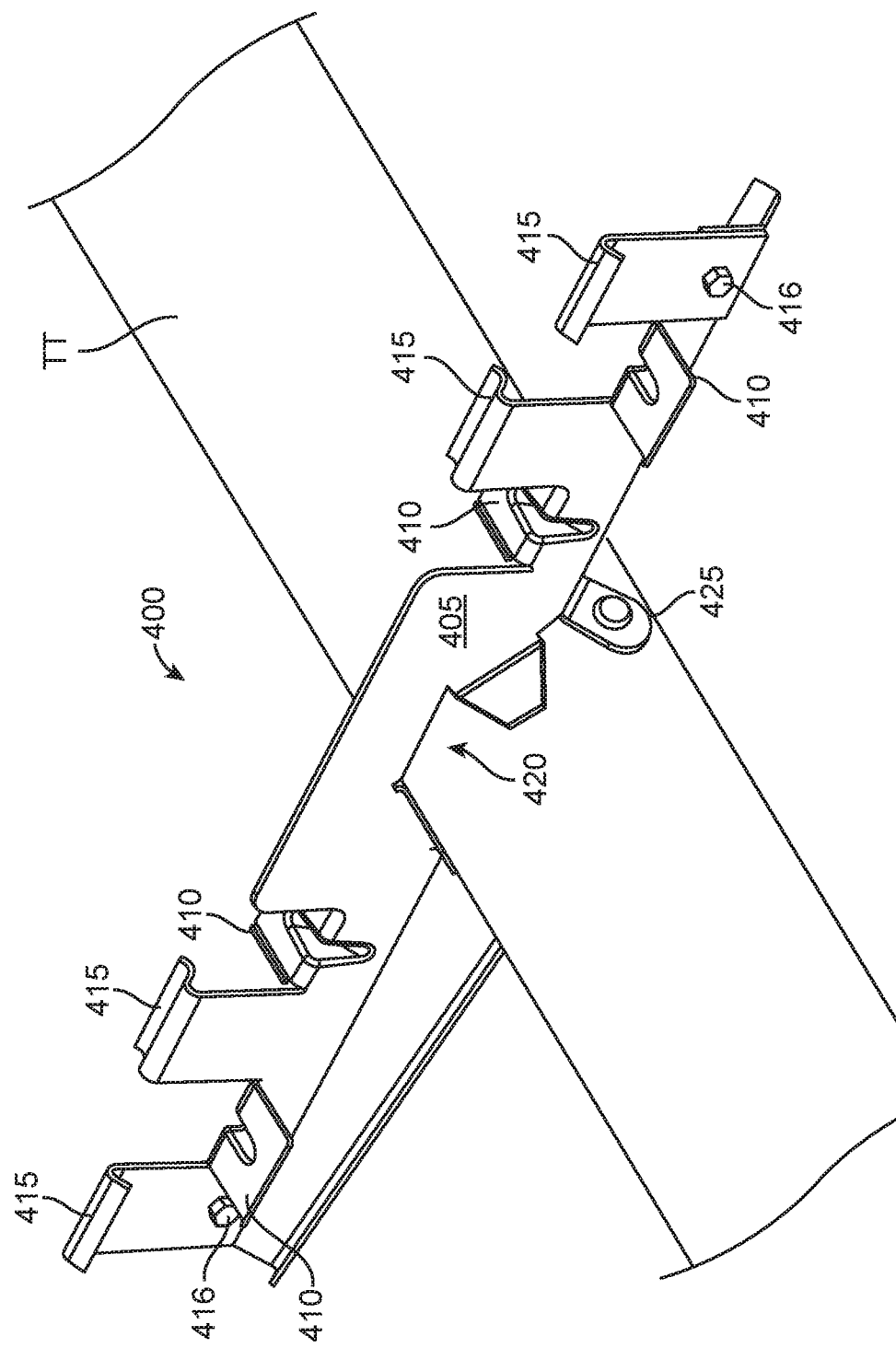
FIGS. 5 through 10C show incremental steps of a process for installing photovoltaic modules on a torque tube with the mounting bracket of FIG. 4 according to various embodiments of the invention.
Figure 6A:
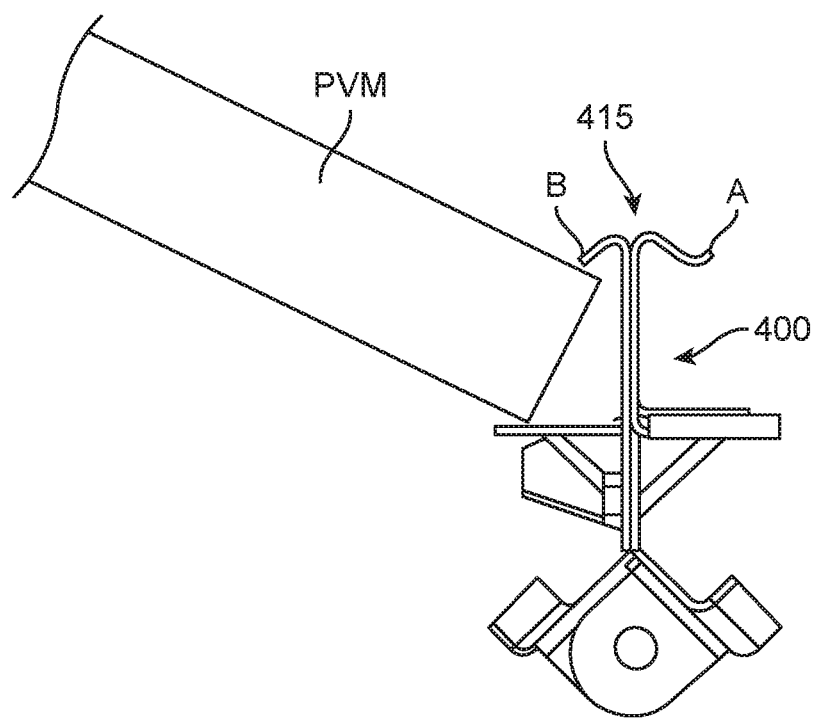
Figure 6B:
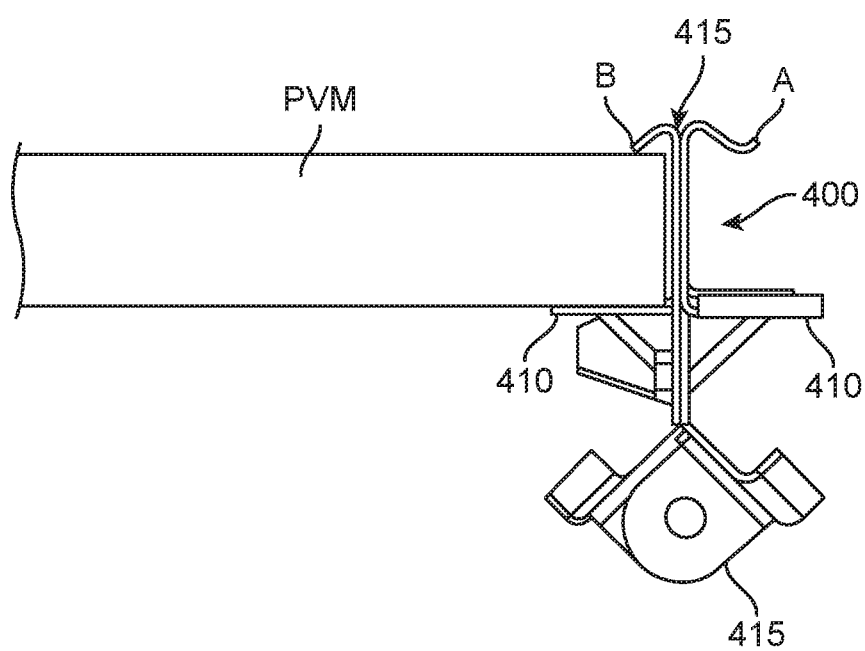

Referring now to FIG. 4, this figure shows a photovoltaic mounting system for attaching PV modules to a torque tube according to further embodiments of the invention. This system includes bracket 400. Bracket 400 is similar to bracket 200 in that it is a two-sided bracket. Bracket 400 can include collar portion 420, which in turn can include torque tube rivet tabs 425 for attaching bracket 400 to a torque tube. Opposing ledge portions 410 can be located at either side of main body 405 to support the frames of two adjacent PV modules. Bracket 400 can also include opposing attachment tabs 415, some of which face one side and others of which face the opposing side.

One feature that distinguishes bracket 400 from other brackets disclosed herein (e.g., 100, 200, & 300), is that half of attachment tabs 415 have a bolt 416 that enables the tab to be removed from below. With this configuration, every module will have one set of attachment tabs that are removable, making it easier to remove a defective/non-functional module without having to remove the collar. This is discussed in greater detail in the context of FIGS. 11A and 11B. This bolting arrangement is not exclusive to bracket 400, and can be used with any of the brackets disclosed herein.

Referring now to FIGS. 5-10C, these figures show various steps in the installation of PV modules onto a tracker array using the saddle bracket 400 of FIG. 4. For example, starting with FIG. 5, the first bracket 400 is installed on the torque tube by riveting it or otherwise affixing it through rivet tabs 425. Then, as shown in FIG. 6A, the first module is pivoted down under the detachable attachment tabs 415. As seen in FIG. 6A, in various embodiments, the detachable attachment tabs, that is the ones with bolts 416 may be shaped differently (e.g., 400B) than the other attachment tabs (e.g., 400A) because one bracket is already pre-attached to the torque tube when the module is attached and the other is not.

Figure 7:
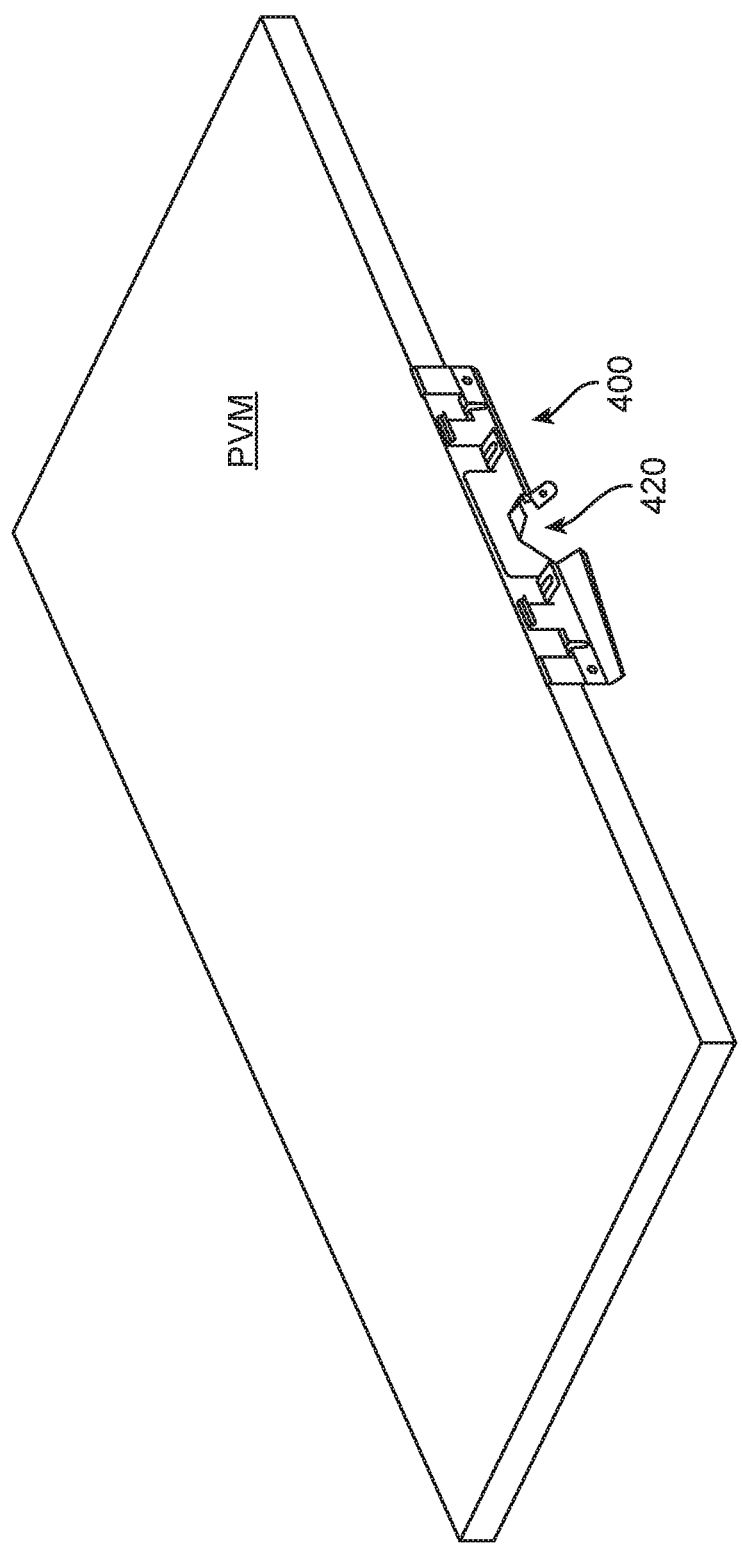
Figure 8A:
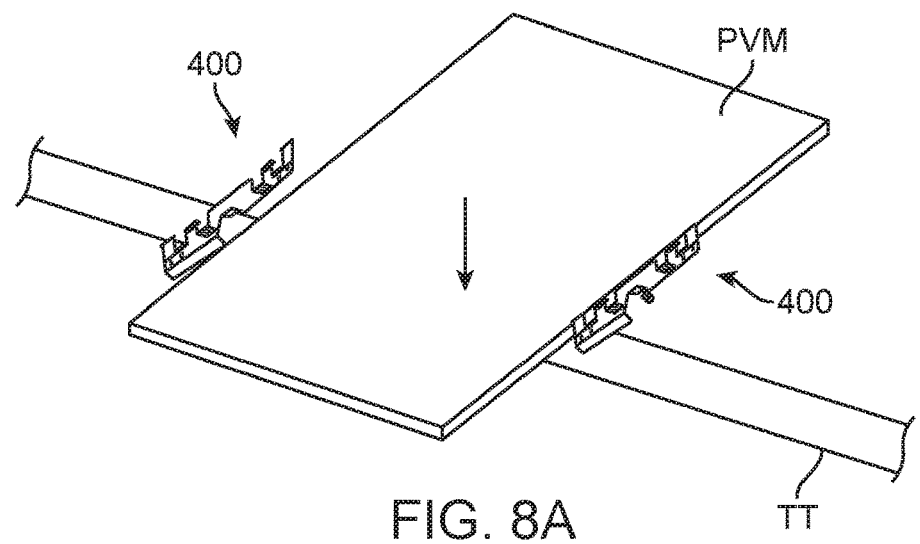
Figure 8B:
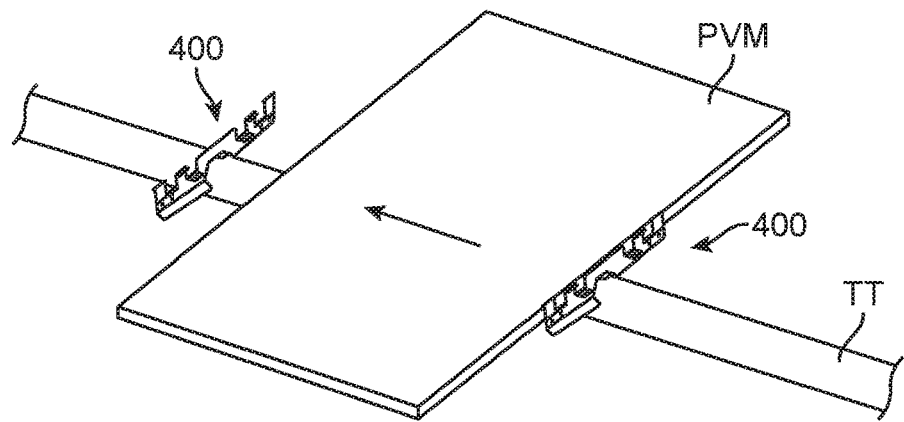
Figure 8C:
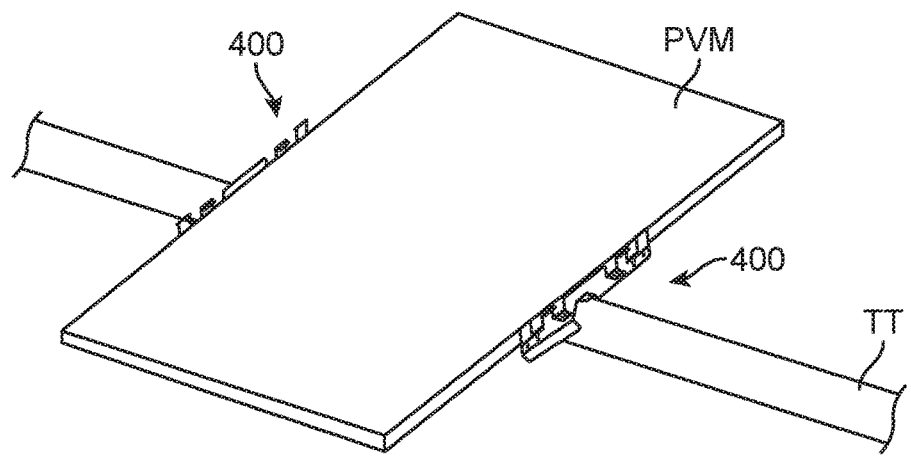

As seen at FIG. 7, in various embodiments the next saddle bracket 400 is attached to the PV module off of the torque tube so that when each module is pivoted under the attached bracket 400 it already has a bracket on the other side that can then be riveted to the torque tube. So each time a subsequent module is dropped on the torque tube to be attached to an existing saddle bracket, it will provide another existing open saddle bracket for the next module, and so on, and so forth until all modules have been attached to the torque tube. This sequence is depicted at FIGS. 8A to 8C. At FIG. 8A, module PVM and attached right-most bracket 400 is placed onto torque tube TT, which already has left most located bracket 400 attached. Then, at FIG. 8B the module PVM is slid towards the pre-attached bracket until the configuration of FIG. 8C is achieved.

Figure 9A:
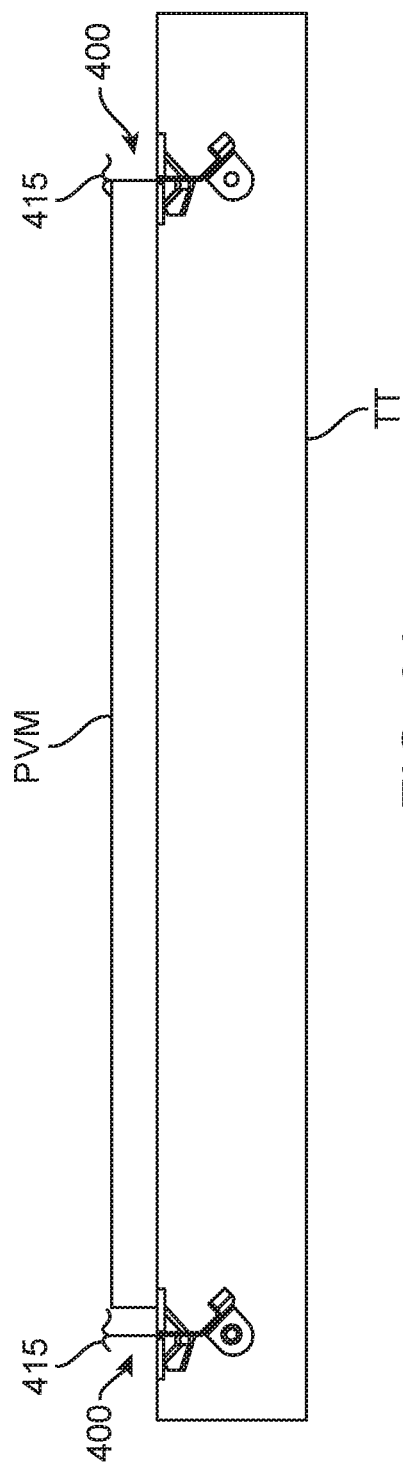
Figure 9B:
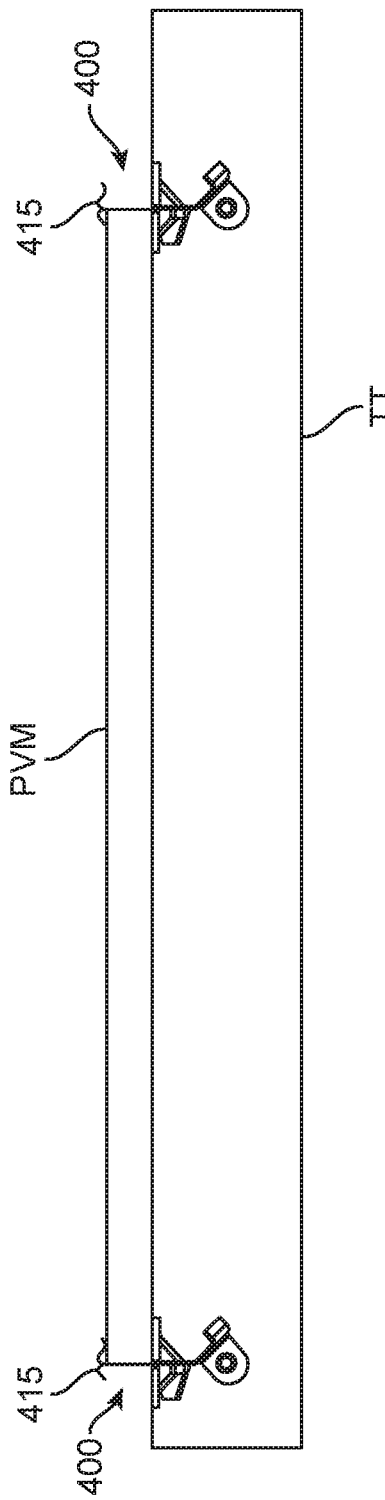
Figure 10A:
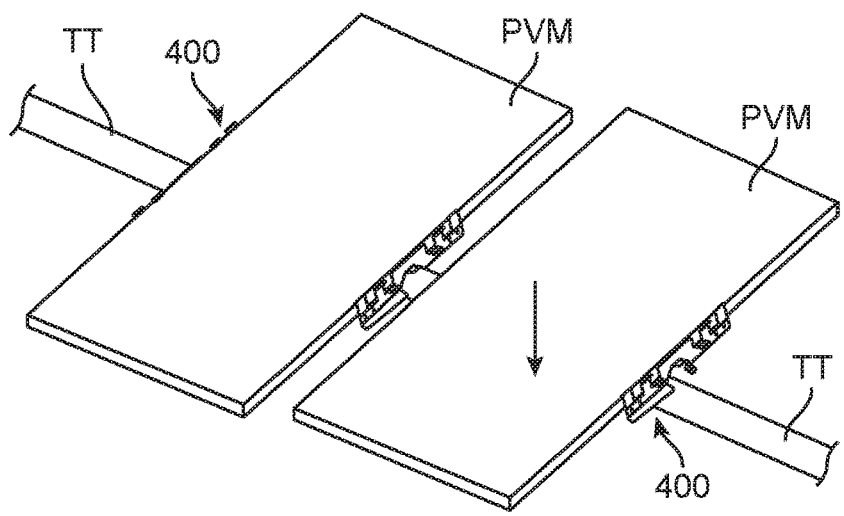
Figure 10B:
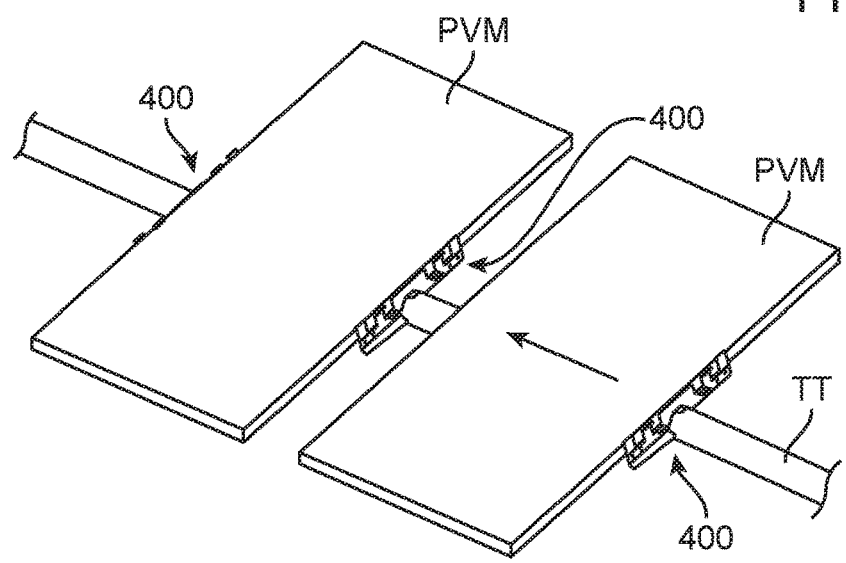
Figure 10C:
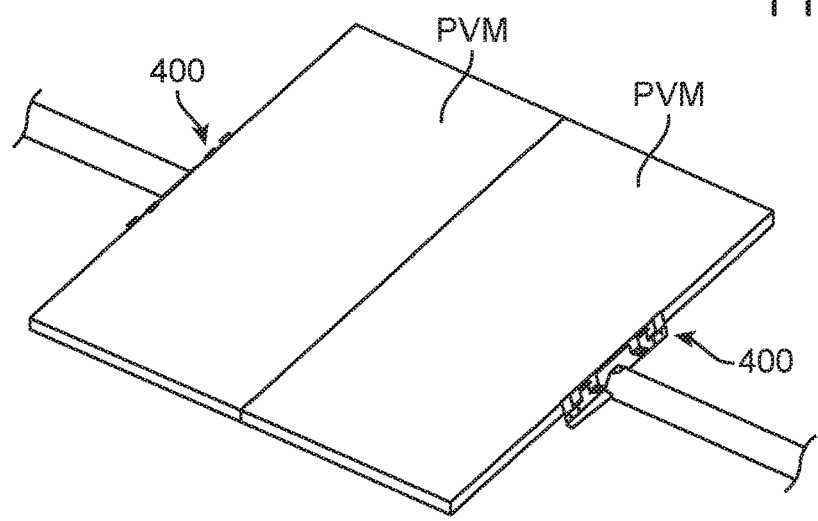

FIGS. 9A and 9B show with greater detail how a PV module with an attached saddle bracket is slid into a pre-installed saddle bracket. The upturned lip on the attachment tab 415 allows the module to be slid underneath it without catching. Because the other saddle bracket is attached off of the torque tube, it doesn't require the upturned lip. FIG. 10 shows how the process is repeated with additional modules. A next module with one attached saddle bracket is dropped down on the torque tube so that the collar portion 420 engages the torque tube. Then, it is slid laterally along the torque tube in the direction of the pre-attached saddle bracket until the module clicks under it (as seen in FIG. 9C).

Figure 11A:
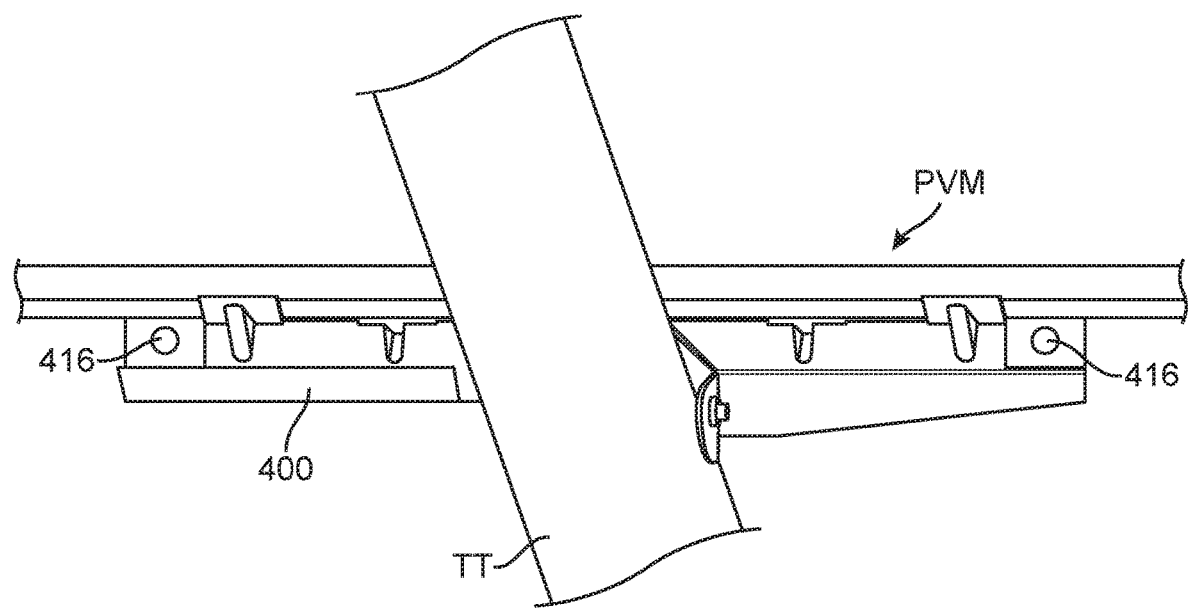
FIGS. 11A and 11B show a process for uninstalling a photovoltaic module from a torque tube with the mounting bracket of FIG. 4 according to various embodiments of the invention.
Figure 11B:
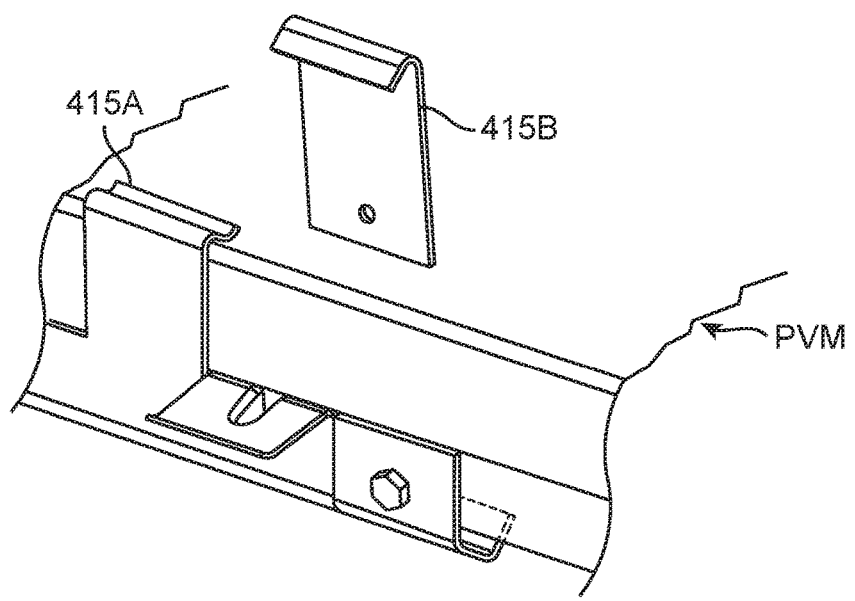

FIGS. 11A and 11B shows the process for removing a module that is attached using saddle bracket 400, or any bracket using removable holding tabs. This may need to be done, for example, if a module, junction box, or other component fails. The process is accomplished by removing bolt 416 holding tab 415B on to saddle bracket 400. This can be done from underneath the module, as shown at FIG. 11A, making it easier for the technician and eliminating the need to rotate torque tube TT to a particular orientation so that the technician can get above the array. After tabs 415B have been removed, the module can simply be pushed up from the bottom. This will release it from tabs 415A of the opposing saddle bracket. A new module can simply dropped down in and tabs 415B re-attached to lock it in place.

The various embodiments of the invention have been discussed in the context of a single axis tracker, however, it should be appreciated that the saddle brackets discussed herein may also be usable with a dual-axis tracker or even possibly a stationary ground mounted solar array. Furthermore, the drawings included herewith are exemplary only and are not intended to limit the various embodiments of the invention to a particular geometry, design or materials. Those of ordinary skill in the art will understand and appreciate that various modifications and/or substitutions may be made without departing from the spirit or scope of the invention.

What is claimed is:

1. A photovoltaic (PV) module mounting bracket for a solar tracker array comprising:
   a collar portion defining a round shape configured to mount to at least a portion of a round torque tube of a solar tracker array, the collar portion comprising a mounting tab having a mounting hole and an alignment tab; and
   a saddle portion having at least one ledge portion configured to support a bottom portion of a PV module and at least one attachment tab configured to resiliently retain an upper portion of the PV module to the at least one ledge portion,
   wherein the PV module mounting bracket is configured to mount to the torque tube adjacent to a second PV module mounting bracket so that the at least one ledge portion extends in a first direction opposite a second direction that a second ledge portion of a second saddle portion of the second PV module mounting bracket extends so that the mounting tab overlaps with a second mounting tab of the second PV module mounting bracket in order for a single fastener to extend through the mounting tab of the PV module mounting bracket and the second mounting tab of the second PV module mounting bracket to mount to a single hole in the torque tube, and so that the alignment tab is inserted into an opening of the torque tube with a second alignment tab of the second PV module mounting bracket.

2. The PV module mounting bracket of claim 1, wherein the collar portion and saddle portion are made of a single piece of sheet metal, and wherein the alignment tab comprises a folded portion of the sheet metal.

3. The PV module mounting bracket of claim 2, wherein the folded portion is attached to a wall portion of the collar portion.

4. The PV module mounting bracket of claim 1, wherein a wall extends between the collar portion and the saddle portion, wherein the wall comprises at least one bumper portion.

5. The PV module mounting bracket of claim 4, wherein the bumper portion extends in an opposite direction from the first direction and is configured to prevent the saddle portion from backing off the PV module.

6. A photovoltaic (PV) module mounting bracket for a solar tracker array comprising:
   a planar wall member;
   a plurality of upper attachment tabs extending laterally from the wall member in a first direction and configured to apply compressive force to an upper edge of a PV module;
   a plurality of ledge portions extending from the wall member in the first direction and configured to support a bottom surface of the PV module against the compressive force provided by the upper attachment tabs;

at least three collar members extending from the wall member in the first direction, wherein the at least three collar members are arranged in a round pattern and configured to mount onto a round torque tube, a tab portion extending from the wall member, the tab portion configured to receive a mechanical fastener to extend into a hole in the torque tube for connection to the torque tube; and an alignment tab extending from the wall member, the alignment tab configured to extend into an opening of the torque tube, wherein the wall member, plurality of upper attachment tabs, ledge portions, and collar members are formed from a single piece of sheet metal.

7. The PV module mounting bracket of claim 6, wherein the wall member comprises at least one reinforcement rib extending laterally away from the wall member.

8. The PV module mounting bracket of claim 6, wherein the collar members are configured to resiliently bias against the torque tube.

* * * * *